US010430878B2

(12) United States Patent
Co et al.

(10) Patent No.: US 10,430,878 B2
(45) Date of Patent: Oct. 1, 2019

(54) MATCHED ORDER FULFILLMENT WITH LINEAR OPTIMIZATION

(75) Inventors: Richard Co, Chicago, IL (US); John Nyhoff, Darien, IL (US); Xing Su, Chicago, IL (US); Tuen Tuen Wang, Chicago, IL (US); John Labuszewski, Westmont, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 237 days.

(21) Appl. No.: 13/617,845

(22) Filed: Sep. 14, 2012

(65) Prior Publication Data

US 2014/0081818 A1  Mar. 20, 2014

(51) Int. Cl.
*G06Q 40/00* (2012.01)
*G06Q 40/04* (2012.01)

(52) U.S. Cl.
CPC .................................. *G06Q 40/04* (2013.01)

(58) Field of Classification Search
CPC ........ G06Q 40/04; G06Q 40/06; G06Q 40/00; G06Q 10/0637; G06Q 10/067
USPC ..................................................... 705/35–45
See application file for complete search history.

(56) References Cited

U.S. PATENT DOCUMENTS

| 2002/0010667 A1* | 1/2002 | Kant et al. ....................... 705/35 |
| 2005/0187849 A1* | 8/2005 | Bollapragada et al. ........ 705/36 |
| 2012/0296808 A1* | 11/2012 | RovelleQuartz ................ 705/39 |
| 2013/0232091 A1* | 9/2013 | Garlanger et al. .......... 705/36 R |
| 2014/0067635 A1* | 3/2014 | Barker et al. ................... 705/35 |
| 2014/0195410 A1* | 7/2014 | Patel .............................. 705/37 |

OTHER PUBLICATIONS

Jul. 26, 2006 Beta Weighted Deltas hosted by Tom Preston.*
Beta (finance)—Wikipedia, the free encyclopedia accessed using archive.org.*
Using Excel Solver in Optimization Problems Chandrakantha, L. accessed using archive.org.*
Theoretical and numerical constraint-handling techniques used with evolutionary algorithms: a survey of the state of the art Coello C.A.C. 2002.*
Jumping the Gates: Using Beta-Overlay Strategies to Hedge Liquidity Constraints, Healy, A.D, , Lo, A.W., 2009.*

(Continued)

*Primary Examiner* — Chia-Yi Liu
(74) *Attorney, Agent, or Firm* — Lempia Summerfield Katz LLC (57) ABSTRACT

A method for matching compound orders from a group of market participants includes receiving, via a communication network, compound order data, the compound order data specifying a maximum amount of a financial instrument of a plurality of financial instruments to be bought or sold by each market participant, accessing a memory in which price data is stored, the price data indicating a current price of each financial instrument, implementing, with a processor, a linear solver to maximize fulfillment of the compound orders via order matching for execution at the current prices in accordance with the maximum amounts specified in the compound order data and in accordance with a maximum net risk exposure level for each market participant arising from the fulfillment of the compound orders, and transmitting trade data indicative of the order matching for execution of trades among the market participants at the current prices.

15 Claims, 5 Drawing Sheets

(56) References Cited

OTHER PUBLICATIONS

An evolutionary Solver for linear integer programming, Pedroso, J.P., 1998.*
CESR's Guidelines on Risk Measurement and the Calculation of Global Exposure and Counterparty Risk for UCITS, Apr. 19, 2010.*
Kezong Tang, Xiaojing Yuan, Puchen Liu and Jingyu Yang (2011). Linear Evolutionary Algorithm, Evolutionary Algorithms, Prof. Eisuke Kita (Ed.), ISBN: 978-953-307-171-8, InTech.*
A real coded genetic algorithm for solving integer and mixed integer optimization problems Kusum Deep, Krishna Pratap Singh , M.L. Kansal , C. Mohan, 2009.*
An efficient constraint handling method for genetic algorithms, Deb K. 2000.*
Submission to Commodity Futures Trading Commission re Exchange Certification of Rule 582 Governing GLOBEX Switch Trade Matching Algorithm, 7 pages, May 7, 2004.

* cited by examiner

SECTOR STOCK INDEX FUTURES

| Stock Index | Index Value (5/31/11) | Futures Contract Multiplier | Futures Contract Notional Value | Index Beta relative to S&P 500 |
|---|---|---|---|---|
| Consumer Discretionary | 406.16 | $100 | $40,616 | 1.071 |
| Consumer Staples | 320.07 | $100 | $32,007 | 0.556 |
| Energy | 740.15 | $100 | $74,015 | 1.342 |
| Financial | 157.20 | $250 | $39,300 | 1.267 |
| Health Care | 361.71 | $100 | $36,171 | 0.584 |
| Industrial | 376.59 | $100 | $37,659 | 1.261 |
| Materials | 406.10 | $100 | $40,610 | 1.411 |
| Technology | 264.80 | $100 | $26,480 | 1.001 |
| Utilities | 341.42 | $100 | $34,142 | 0.723 |
| S&P 500 | 1,337.77 | $50 | $66,889 | 1.000 |

ENTERED ORDERS

| | Acct 1 | Acct 2 | Acct 3 | Acct 4 |
|---|---|---|---|---|
| Consumer Discretionary | 34 | 138 | -121 | -85 |
| Consumer Staples | 169 | 225 | -421 | 104 |
| Energy | -76 | -201 | 121 | 75 |
| Financial | 0 | -201 | 60 | 149 |
| Health Care | 568 | 189 | -355 | -350 |
| Industrial | 0 | 126 | -63 | -78 |
| Materials | 52 | -35 | 0 | -32 |
| Technology | 226 | 226 | -226 | -279 |
| Utilities | -304 | -567 | 608 | 300 |
| S&P 500 | -157 | 299 | -11 | 0 |

FILLED ORDERS

| | Acct 1 | Acct 2 | Acct 3 | Acct 4 | TOTAL |
|---|---|---|---|---|---|
| Consumer Discretionary | 34 | 138 | -98 | -74 | 0 |
| Consumer Staples | 169 | 225 | -421 | 27 | 0 |
| Energy | -75 | -110 | 111 | 75 | 0 |
| Financial | 0 | -201 | 52 | 149 | 0 |
| Health Care | 568 | 137 | -355 | -350 | 0 |
| Industrial | 0 | 126 | -63 | -63 | 0 |
| Materials | 52 | -20 | 0 | -32 | 0 |
| Technology | 226 | 226 | -176 | -276 | 0 |
| Utilities | -304 | -567 | 571 | 300 | 0 |
| S&P 500 | -157 | 168 | -11 | 0 | 0 |

BETA-WEIGHTED NOTIONAL EXPOSURE

| | Acct 1 | Acct 2 | Acct 3 | Acct 4 |
|---|---|---|---|---|
| Consumer Discretionary | $1,478,991 | $6,002,964 | -$4,265,276 | -$3,216,678 |
| Consumer Staples | $3,007,506 | $4,004,076 | -$7,492,071 | $480,489 |
| Energy | -$7,459,320 | -$10,971,596 | $10,981,306 | $7,449,610 |
| Financial | $0 | -$10,008,413 | $2,589,241 | $7,419,172 |
| Health Care | $11,998,355 | $2,893,969 | -$7,498,972 | -$7,393,352 |
| Industrial | $0 | $5,983,488 | -$2,991,744 | -$2,991,744 |
| Materials | $2,979,637 | -$1,146,014 | $0 | -$1,833,623 |
| Technology | $5,990,464 | $5,990,464 | -$4,671,656 | -$7,309,273 |
| Utilities | -$7,504,138 | -$13,996,206 | $14,094,944 | $7,405,400 |
| S&P 500 | -$10,501,495 | $11,237,268 | -$735,774 | $0 |
| TOTAL | -$10,000 | -$10,000 | $10,000 | $10,000 |

FIG. 5

MATCHED ORDER FULFILLMENT WITH LINEAR OPTIMIZATION

BACKGROUND

A financial instrument trading system, such as a futures exchange, referred to herein also as an "Exchange", such as the Chicago Mercantile Exchange Inc. (CME), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Although futures contracts generally confer an obligation to deliver an underlying asset on a specified delivery date, the actual underlying asset need not ever change hands. Instead, futures contracts may be settled in cash such that to settle a future, the difference between a market price and a contract price is paid by one investor to the other. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract price.

By employing cash settlement, futures may be based on more abstract market indicators, such as stock indices, interest rates, futures contracts and other derivatives. Rather than requiring the delivery of a market index (a concept that has no real meaning), or delivery of the individual components that make up the index, at a set price on a given date, index futures can be settled in cash. The difference between the contract price and the price of the underlying asset (i.e., current value of market index) is exchanged between the investors to settle the contract.

Traders frequently trade multiple futures contracts rather than focus on any single futures contract. In a typical futures trading environment, traders enter into a "spread" between two distinct, yet similar contracts by buying or going long in one contract and selling or going short in another contract. A trader may enter into a "calendar" or "intra-market spread" by buying and selling two futures contracts in the same market but in different contract months, such as the purchase of a March Eurodollar futures contract coupled with the sale of a September Eurodollar futures contract. A trader may enter into an "inter-market" spread by buying and selling two futures contracts in different markets, such as the purchase of a 5-year Treasury note futures contract coupled with the sale of a 10-year Treasury note futures contract.

A trader may "leg into" spreads by entering two separate orders for the long and short portions of the spread. Frequently, however, spread trading is accommodated by directly listing a spread on the exchange so that the spread may be executed at a singular price without legging into the two sides of the spread separately. Once a transaction price for the spread is established, the exchange thereupon books the two separate legs of the spread separately.

More complex spreads or "combination trades" are also commonplace. A "butterfly" spread entails the execution of transactions across three different contract months in a particular futures contract. For example, a trader may buy one March Eurodollar futures, sell two June Eurodollar futures and buy one September Eurodollar futures.

Option contracts are particularly conducive to complex combinations of transactions spread across puts and calls; strike prices as well as expiration dates. For example, a trader may enter into a vertical bull call spread by buying a low-struck Euro-US dollar call and selling a high-struck Euro-US dollar call, with the same expiration data. Frequently, option combinations may involve two, three, four or more different options.

"Packs" and "bundles" of Eurodollar option contracts may be traded with the use of a singular order traded at a singular price. For example, a 2-year bundle may be executed by buying (or selling) the first eight quarterly expiring Eurodollar futures.

In many cases, the exchange will list such complex or combination spreads or transactions just as the exchange may list calendar and inter-market spreads that may be traded directly as a singular order. The exchange may apply an algorithm to determine the price of the individual legs of the spread once the transaction is concluded at a singular price or price differential.

The exchange may limit its listings of complex or combination spreads to the more popular or frequently traded of such transactions. Traders interested in more complicated orders that are not listed on the exchange may be compelled to "leg-into" the trade by executing each individual leg separately. But the process of legging into the spread entails risk to the extent that one may be unable to execute one or more legs, or that prices fluctuate adversely after one has already executed one or more leg(s) of the transaction and before one has concluded the other legs. In the latter case, the trader thus incurs a loss relative to the original spread price to complete the spread trade.

BRIEF DESCRIPTION OF THE DRAWINGS

FIG. 5 shows an exemplary implementation of the disclosed embodiments.

DETAILED DESCRIPTION

The disclosed embodiments relate to trade matching systems and methods. The disclosed systems and methods are configured to maximize fulfillment and matching of compound or composite orders. The fulfillment of such orders may facilitate joint asset liability bargaining for a group of traders or other market participants. With the disclosed systems and methods, market participants may execute a combination of individual transactions with the placement of a single, composite or compound order for multiple financial products or instruments. The disclosed systems and methods allow the market participants to use the compound order to participate in multiple markets.

The compound orders may be collected or otherwise received over a specified period of time, e.g., during the course of a single hour, day, week, etc., which may be referred to as the "pre-opening" period. Upon conclusion of the pre-opening period, all received orders are processed by the disclosed methods and systems for trade matching directed to executing the orders jointly while maximizing the number of filled orders that may be matched or executed. Fulfillment is maximized by implementing a linear solver. The linear solver optimizes an operant function defined and otherwise configured to be representative of the order matching process. Fulfillment may thus be optimized on an inter-market basis across a number of distinct contracts for various financial products or instruments.

As described below, the linear solver is implemented in accordance with the net risk arising from the fulfillment and order matching. A maximum net risk exposure level may be specified for each market participant. The maximum net risk exposure level introduces flexibility into the optimization process by allowing each market participant to be allocated a slightly unbalanced portfolio during the order matching process. The maximum net risk exposure level may vary as desired. For example, the disclosed methods and systems may provide each market participant the opportunity to select a maximum net risk exposure level in the form of upper (long) and lower (short) bounds on the net risk exposure level. The maximum net risk exposure level(s) may then be incorporated into the optimization process as a constraint of the operant function.

The disclosed methods and systems may allocate orders to optimize a particular operant function for a variety of different complex or compound order scenarios. One example involves compound orders of CME Group Select Sector stock index futures. The operant function is configured to achieve the maximum number of fills, measured in terms of futures contracts, while ensuring that each participant is assigned a portfolio of futures that presents a net risk exposure below a maximum level and, thus, a balanced net risk exposure.

Although the net risk is measured in the examples described below via a net beta weighted exposure level, other metrics or measures of the net risk may be used, such as the weighted net duration in interest rate products, the weighted net basis point value (BPV or DV01) in interest rate products, or the weighted net British thermal unit (BPU) value in energy products. In these ways, the net risk exposure level may be measured across multiple markets of correlated financial products or other instruments. Different parameters may be used in conjunction with the disclosed methods and systems to accommodate differences in the manner in which such instruments are correlated.

The disclosed methods and systems provide a technique for entering into a series of transactions using a single order mechanism. The series of transactions may be referred to herein as a complex or compound order. In one example, participants in the over-the-counter (OTC) interest rate swap (IRS) markets, including dealers and other financial institutions, may have occasion to enter into a complex series of Eurodollar futures positions, spanning a wide variety of contract months, including long and/or short positions, in configurations that are not reflected in listed spreads, packs or bundles. In another example, a stock index trader may enter into a portfolio of positions, both long and short in a variety of CME Group Select Sector futures contracts, in configurations that are not reflected in listed spreads. In yet another example, a yield curve trader may enter into a series of long and short positions in CME Group Treasury bond and note futures as a means of accepting exposure to movements in the shape of the yield curve, in configurations that are not reflected in listed spreads. In each of these examples, traders may wish to enter, or exit, positions that comprise a portfolio of related risk exposures, for a wide variety of motivations. However, this activity generally implies that one must enter into each "leg" of the complex series of trades separately.

The disclosed methods and systems may support the requests from participating traders through order fulfillment at an established (or to be established) price or value. The disclosed methods and systems may utilize a trade-at-settlement or other batch order processing scheme, as described below.

The trade matching techniques of the disclosed methods and systems may be incorporated into an order matching system of the Exchange. Alternatively or additionally, the disclosed methods and systems may be implemented as part of other order matching processes.

In some embodiments, the disclosed methods and systems are implemented in a centralized processing system, such as one hosted by the Exchange. Alternatively, the disclosed embodiments may be implemented in a distributed fashion where a portion of the functionality may be implemented on a computer system of the market participant. For example, a client application may be provided to the market participant, or otherwise integrated with the trading interface utilized thereby. The client application may then interface or otherwise interact with a back-end system or database of the Exchange to submit bids, or otherwise exchange data and messages therewith.

While the disclosed embodiments may be discussed in relation to inter-market trading in various correlated futures contracts, such as stock (e.g., stock sector) index futures contracts relative to a market index, it will be appreciated that the disclosed embodiments may be applicable to other futures contracts, such as interest rate futures or energy futures. The disclosed methods and systems may also be used in the trading of financial instruments, such as securities products, e.g., stocks or bonds, to the trading over-the-counter (OTC) derivative products, e.g., interest rate swaps (IRS), credit default swaps (CDS), currency forwards, commodity swaps, equity swaps, etc. The disclosed methods and systems may be applied to many different equity, options, or futures trading system or other market now available or later developed where market participants may wish to enter into a composite order involving multiple, correlated financial instruments. For example, the disclosed methods and systems may be used in the context of various interest rate, currency, and physical commodity markets, such as agricultural markets.

The financial instruments may thus be correlated with one another in a variety of ways, and need not be correlated with one another via a market index. The disclosed methods and systems may be used in connection with uncorrelated financial instruments.

It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

Figure 1:
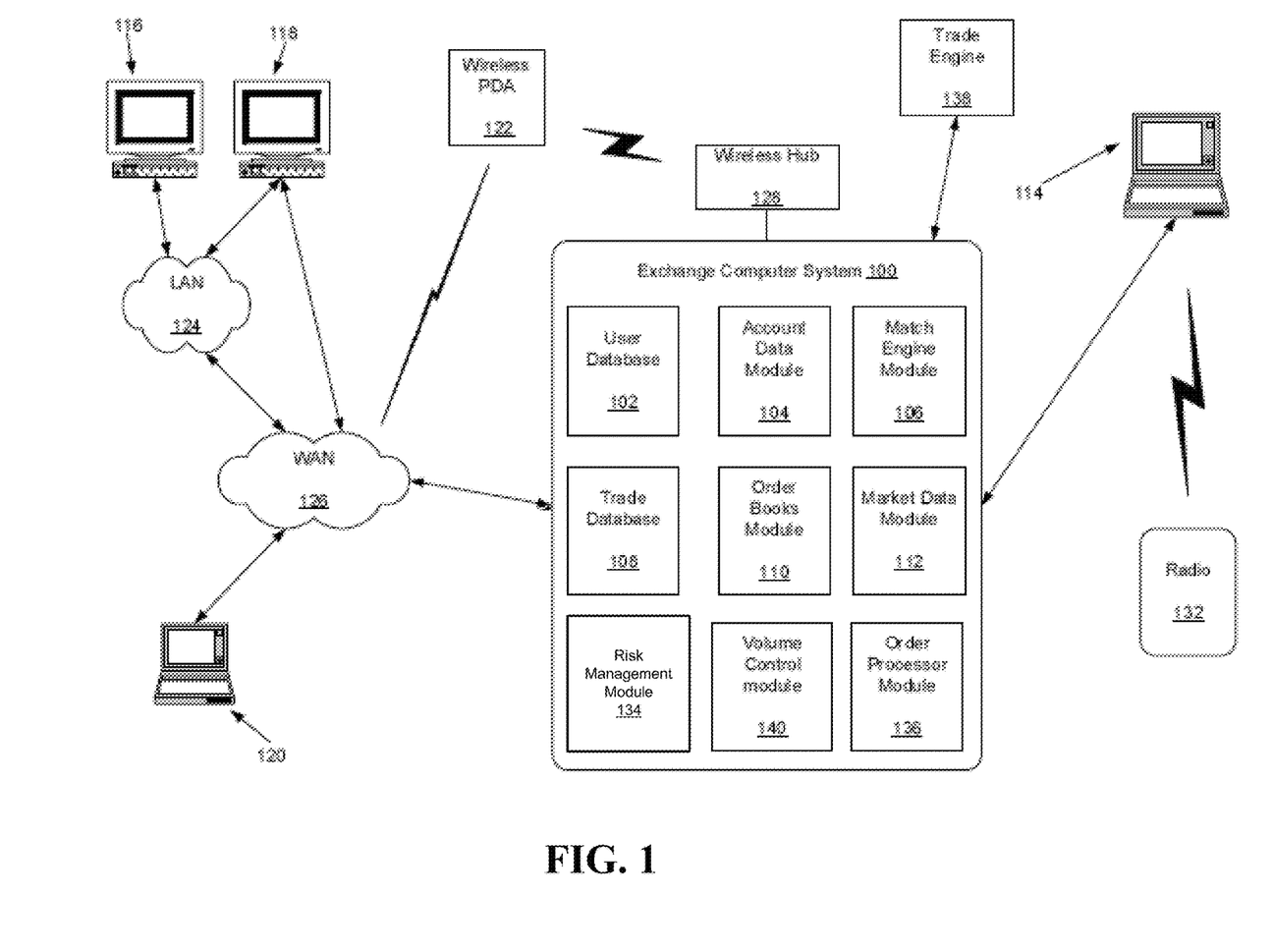
FIG. 1 depicts an illustrative computer network system that may be used to implement aspects of the disclosed embodiments.

An exemplary trading network environment for implementing trading systems and methods is shown in FIG. 1. An exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, ... and <N>" or "at least one of <A>, <B>, ... <N>, or combinations thereof" are defined by the Applicant in the broadest sense, superseding any other implied definitions herebefore or hereinafter unless expressly asserted by the Applicant to the contrary, to mean one or more elements selected from the group comprising A, B, ... and N, that is to say, any combination of one or more of the elements A, B, ... or N including any one element alone or in combination with one or more of the other elements which may also include, in combination, additional elements not listed.

The exchange computer system 100 may be implemented with one or more mainframe, desktop or other computers, such as the computer 400 described below in connection with FIG. 4. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. The match engine module 106 may be configured to implement one or more aspects of the disclosed methods and systems, including, for instance, the optimization of matched fulfillment of complex or compound orders of correlated financial instruments. The match engine module 106 may be in communication with one or more of the local area network 124, the wide area network 126, or other elements of the exchange computer system 100 to receive data indicative of the orders from the market participants.

A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. The risk management module 134 may also be configured to determine risk assessments or exposure levels in connection with positions held by a market participant. An order processing module 136 may be included to decompose delta-based and bulk order types for processing by the order book module 110 and/or the match engine module 106. A volume control module 140 may be included to 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

The trading network environment shown in FIG. 1 includes exemplary computer devices 114, 116, 118, 120 and 122, which depict different exemplary methods or media by which a computer device may be coupled with the exchange computer system 100 or by which a user may communicate, e.g. send and receive trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for receiving market data from exchange computer system 100 and displaying that information to a user.

Numerous additional servers, computers, handheld devices, personal digital assistants, telephones and other devices may also be connected to the exchange computer system 100. Moreover, the topology shown in FIG. 1 is merely an example and that the components shown in FIG. 1 may include other components not shown and be connected by numerous alternative topologies.

As shown in FIG. 1, the match engine module 106 and/or the order processing module 136 of the Exchange computer system 100 may implement one or more aspects of the order matching and fulfillment provided by the disclosed methods and systems, as will be described with reference to FIG. 2. It will be appreciated the disclosed embodiments may be implemented as a separate module or a separate computer system coupled with the Exchange computer system 100 so as to have access to the requisite order, pricing, and/or other data. As described above, the disclosed embodiments may be implemented as a centrally accessible system or as a distributed system, e.g., where some of the disclosed functions are performed by the computer systems of the market participants.

The above-described modules of the Exchange computer system 100 may be implemented in connection with a trade at settlement (TAS) process or other batch settlement process. In a TAS process, buyers and sellers enter orders to transact in a specified futures contract at the daily settlement price. Daily settlement prices may be established as a representative price traded during the last minute or 30 seconds of the daily trading session. The daily settlement price may be established as the midpoint of the closing range, e.g., the high-low range traded during the last minute or 30 seconds of the session. Alternatively, the daily settlement price may be established by reference to the Volume Weighted Average Price (VWAP) established during the final minute or 30 seconds of the daily trading session. A VWAP technique may be used in connection with products that are traded electronically as opposed to products traded via open outcry to the extent that it may be difficult or impossible to identify each specific transaction by price and volume transacted during the last minute or 30 seconds of trade when traded in a pit. The disclosed methods and systems are not limited to VWAP techniques or TAS processes, and may instead use any type of settlement technique that determines a number of prices to process orders in bulk or as a batch.

TAS procedures involve traders entering orders to buy or sell at a price to be determined via the daily settlement process. Once orders are accepted and the settlement price is established, the buy and sell orders may be matched. The time at which the orders are matched may vary. For example, the disclosed methods and systems may be implemented before the settlement prices are established, but, for example, after a deadline for entering the compound orders. In either case, there may typically be excess or surplus buys and sells that cannot be matched. For example, if there are 1,000 entered buy orders and 1,500 entered sell orders for a particular product, a total of 1,000 orders may be matched while 500 of those surplus sell orders may be unfulfilled.

In some TAS processes, the Exchange applies an algorithm to identify which surplus orders go unfulfilled. This algorithm may reference a "first-in, first-out" rationale, i.e., the orders that are placed first take precedence over orders that are accepted subsequently. Alternatively, the surplus orders may be identified randomly. The surplus orders may alternatively be identified proportionately to the size of the order entered. In the disclosed methods and systems, the allocation or identification of the orders to be fulfilled is instead determined through linear optimization as described below.

Figure 2:
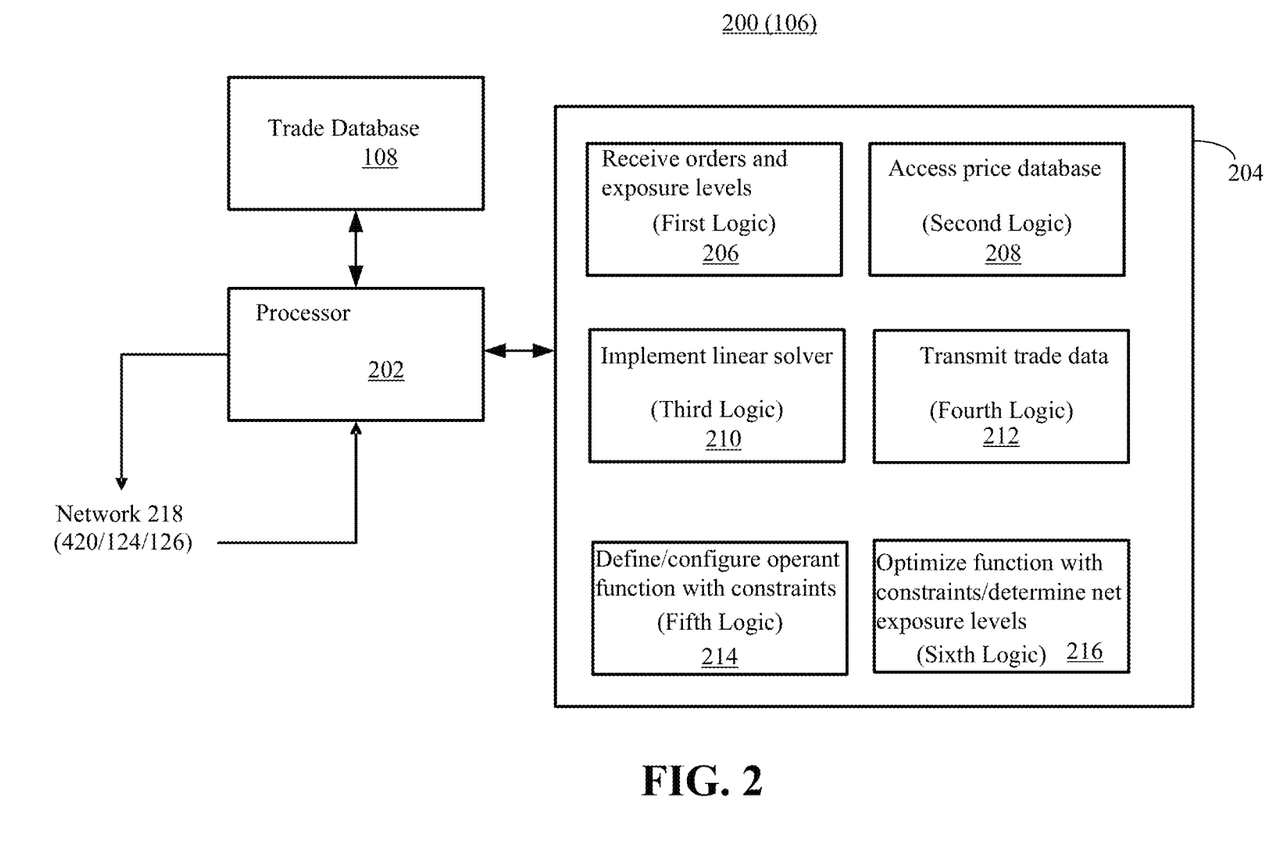
FIG. 2 a block diagram of an exemplary implementation of the system of FIG. 1 for matching compound orders using a linear solver in accordance with the disclosed embodiments.

FIG. 2 depicts a block diagram of a match engine module 106 (and/or order processing module 136) according to one embodiment, which in an exemplary implementation, is implemented as part of the exchange computer system 100 described above. As used herein, an exchange includes a place or system that receives and/or executes compound orders. FIG. 2 shows a system 200 for matching compound orders among a group of market participants to maximize fulfillment in trades of a number of correlated financial instruments. The financial instruments may be correlated with a market, e.g., a broader market index, such as the S&P 500 market index.

The system 200 includes a processor 202 and a memory 204 coupled therewith which may be implemented as a processor 402 and memory 404 as described below with respect to FIG. 4. The system 200 further includes a first logic 206 stored in the memory 204 and executable by the processor 202 to cause the processor 202 to receive, such as via a communication network 218 coupled therewith, compound order data from or for the market participants. The compound order data for each market participant specifies a maximum amount of contracts of each financial instrument to be bought or sold. For example, a trader may specify an interest in buying (or selling) no more than 45 contracts of a particular futures product or other financial instrument. The trader also specifies order data for the other correlated financial instruments.

In this embodiment, the first logic 206 is also configured to cause the processor 202 to receive, via the communication network 218, a maximum net risk exposure level for one or more of the market participants. For example, a trader may specify that, during fulfillment, the system 200 may not match the orders such that the resulting portfolio leaves the trader with a net exposure level greater than $10000. The net exposure level is determined by offsetting the notional amounts of buy orders with the notional amounts of sell orders. Each such maximum net risk exposure level defines a constraint of a linear problem to be solved or optimized during fulfillment as described below. With the first logic 206, each market participant may customize the net risk exposure level that may be reached as a result of the fulfillment of the compound order. The maximum net risk exposure levels may thus differ among the market participants.

As described below, the net risk exposure levels of a portfolio resulting from the order matching may be determined based on a risk metric of each financial instrument relative to a market indicator of the market. In some embodiments, the maximum net risk exposure level is a beta-weighted notional exposure level. The weighting allows the exposure levels to reflect the risk or volatility of each position within the compound order. Other risk metrics may be used to weight the exposure levels. For example, the notional exposure of each order (without any beta or other adjustment) may serve as the risk metric.

Each maximum net risk exposure level may include or specify upper and/or lower bounds on the net risk. The upper and lower bounds may thus differ for each market participant. For example, a trader may be comfortable with more risk when the resulting portfolio of the correlated financial instruments has, on balance, a net long position. The trader may then specify an upper (or long) bound of, e.g., $25000, and a lower (or short) bound of some lower amount, such as $10000.

The system 200 is alternatively or additionally configured with a maximum net risk exposure level to be applied for each market participant. In some cases, the level may present a default level to be used if a market participant elects not to specify an upper or lower bound. Alternatively or additionally, the system 200 may allow each market participant to specify a maximum net risk exposure level as long as the level remains within a limit specified by the system 200.

The system 200 further includes second logic 208 stored in the memory 204 and executable by the processor 202 to cause the processor 202 to access a database in which price data is stored. The database may be trade database 108 (FIG. 1). The price data may include data indicative of a current price of each financial instrument at which the compound orders are to be executed. The processor 202 may be in communication with the trade database 108 or other memory (ies) via the network 218 or any other communication link. The price data may further include historical price data for the financial instruments, which may be used to determine a beta value or other volatility measure as described below.

The system 200 further includes third logic 210 stored in the memory 204 and executable by the processor 202 to cause the processor 202 to implement a linear solver to maximize fulfillment of the compound orders via order matching at the current prices. As described below, the linear solver is implemented in accordance with the data received from the market participants, namely the maximum amounts specified in the compound order data and, in some cases, the maximum net risk exposure levels. The maximum amounts and maximum net risk exposure levels may be used to configure the linear solver as constraints on an operant function to be optimized. The configuration of the linear solver is described in greater detail below.

The system 200 further includes fourth logic 212 stored in the memory 204 and executable by the processor 202 to cause the processor 202 to transmit trade data indicative of the order matching resulting from the implementation of the linear solver. The trade data may be transmitted to one or more of the system modules described above in connection with FIG. 1 to support the execution of trades among the market participants at the current prices.

The system 200 may further include fifth logic 214 stored in the memory 204 and executable by the processor 202 to cause the processor 202 to define and/or configure an integer operant function to be optimized by the linear solver. As described below, the integer operant function is configured and directed to maximize fulfillment of the compound orders. The third logic 210 may include the fifth logic 214 or be otherwise further executable by the processor 202 to direct the implementation of the fifth logic 214.

The integer operant function may be configured such that buy orders are indicated via integer numbers of contracts having an opposite sign of sell orders. For example, buy orders may be indicated by positive integers, and sell orders may be indicated by negative integers, or vice versa. The integer operant function may also be configured such that the order matching results in or otherwise corresponds with a net zero number of positions created for each financial instrument. The number of contracts of each financial instrument that are bought within the group of market participants accordingly matches the number of contracts sold as a result of the fulfillment.

The system 200 further includes sixth logic 216 stored in the memory 204 and executable by the processor 202 to cause the processor 202 to optimize the integer operant function with (i) the maximum amounts, (ii) the maximum net risk exposure levels, and (iii) the order matching within each financial instrument, as constraints on the integer operant function.

The maximum net risk exposure levels may include or specify both upper (or long) and lower (or short) bounds on the exposure levels. The exposure level may be a beta-weighted notional exposure level. In other embodiments, the risk exposure levels may be determined or weighted by other volatility metrics received, accessed, or determined based on, for instance, the historical price data of each financial instrument.

The linear solver may include any commercially available linear optimizer. In some cases, the linear optimizers are computer program products capable of high order processing. The linear solver may alternatively or additionally include customized software modules or systems configured via one or more high-level programming languages.

The linear solver may use one or more of a variety of linear programming techniques to optimize the operant function. The linear optimizer or other linear solver may reach or identify the optimal solution, i.e., the order matching that results in maximum fulfillment of the compound orders. The parameters received or otherwise established by the system 200 are used as constraints on the linear problem presented by the operant function.

Data indicative of any the intermediate or final results of the above-described processing and compound order fulfillment may be stored in the trade database 108, the memory 204, or other database or memory of the system 200 or the exchange computer system 100 (FIG. 1). Data indicative of the compound order fulfillment may be transferred to the market participants via the network 218 or any of the other communications links described herein.

Figure 3:
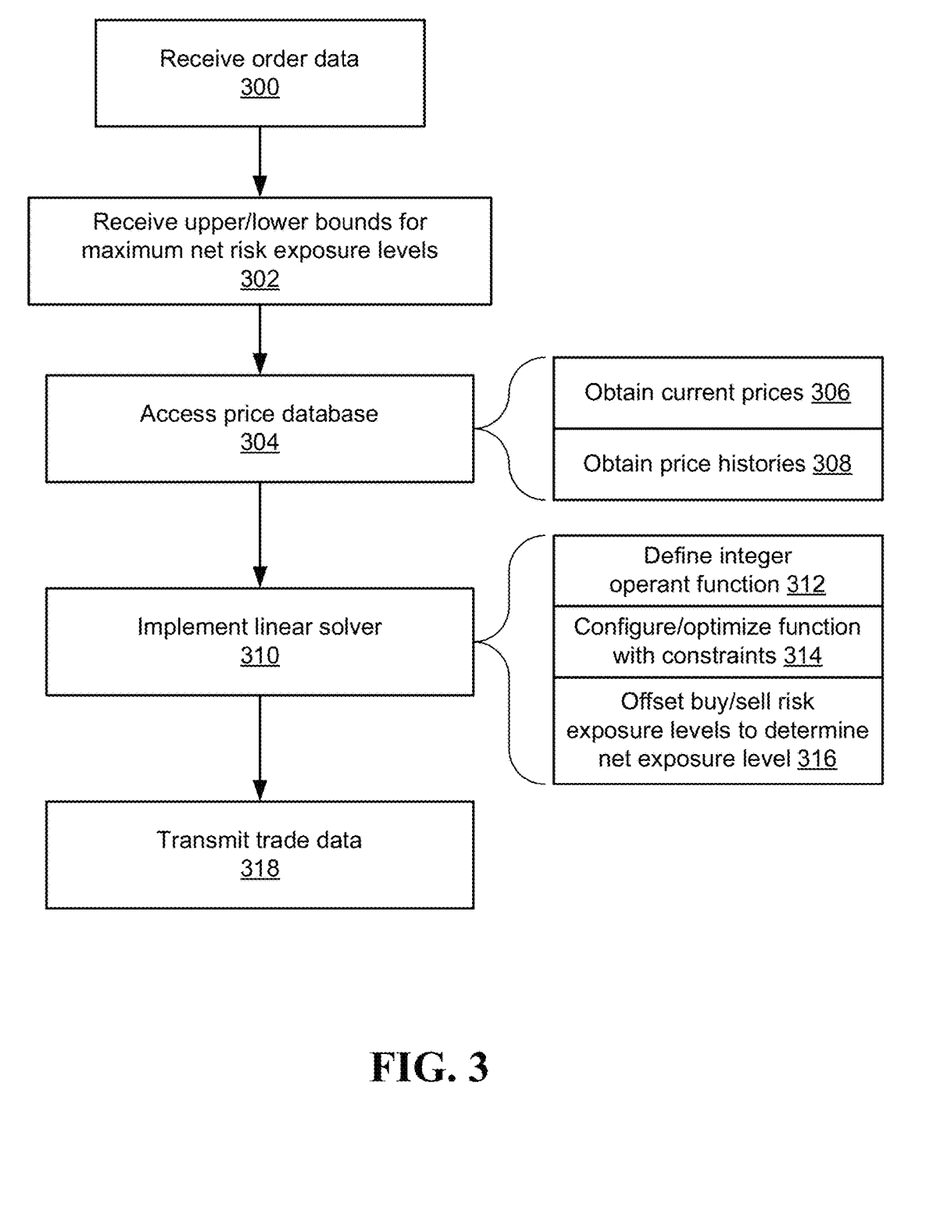
FIG. 3 depicts a flow chart showing operation of the system of FIGS. 1 and 2.

FIG. 3 depicts a flow chart showing operation of the system 200 of FIG. 2. In particular FIG. 3 shows a computer-implemented method for matching compound orders from a group of market participants for a plurality of financial instruments. The financial instruments share one or more contract terms or specifications, or are otherwise correlated with one another. The operation of the system 200 includes: receiving compound order data specifying a maximum amount of each correlated financial instrument [block 300]; receiving upper and lower bounds for maximum net risk exposure levels [block 302]; accessing a price database or other memory in which price data is stored to obtain the current prices of each financial instrument at which the compound orders are to be executed [block 304]; implementing a linear solver to maximize fulfillment of the compound orders in accordance with the maximum amounts and the maximum net risk exposure levels [block 310]; and transmitting trade data indicative of the order matching [block 312].

In some embodiments, the price database or other memory may be accessed to obtain both current prices [block 306] and price history data [block 308]. The price history data may be used to determine the beta or other volatility measure used to weight or determine the exposure levels.

In some embodiments, implementing the linear solver includes defining an integer operant function [block 312], configuring and/or optimizing the function with a number of constraints [block 314], and offsetting the exposure levels resulting from the purchase or sale of the financial instruments to determine a net exposure level [block 316].

The blocks of the above-described method may be implemented in an order other than as shown. For example, the maximum net risk exposure levels may be received or determined before the order data is received. As another example, the price data may be obtained before the compound order or other data is received from the market participants. Additional or alternative blocks may be implemented.

One or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example the modules may be embodied as part of an exchange system 100 for financial instruments.

Figure 4:
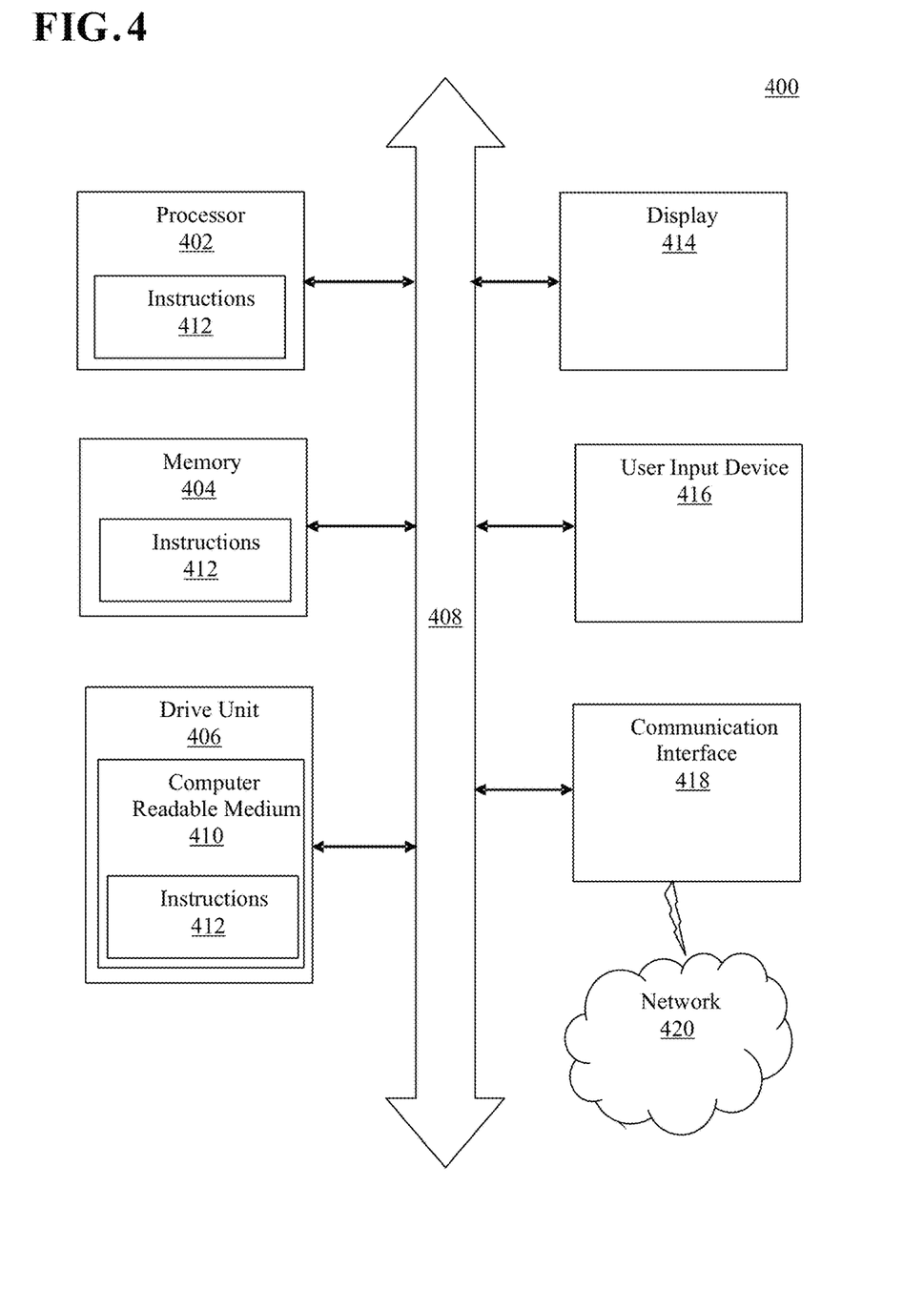
FIG. 4 shows an illustrative embodiment of a general computer system for use with the system of FIGS. 1 and 2.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement a match engine, order processing, and/or other function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Implementation of the disclosed methods and systems is not limited to applications in which actual trading is occurring. The order matching and fulfillment may be part of a simulated trading environment. For example, the matching and fulfillment process may be simulated to show "what if" results according to various combinations of bids and/or positions. The results may be provided to a market participant as feedback in preparation for an actual trading session. The above-described processing systems may be useful for executing large number of such simulated environments to provide market participants with data or information leading up to, or during, the actual trading session. The market participants may use such information to determine maximum order amounts, customize maximum net risk exposure levels, or otherwise prepare for the trading session.

FIG. 5 provides an exemplary implementation of one embodiment of the disclosed methods and systems to maximize fulfillment of compound orders of correlated financial instruments. The example is provided within the context of stock sector index markets with the understanding that the disclosed methods and systems are well suited for other markets, financial instruments, and contexts. The stock sector index products may be the E-mini Standard & Poor's (S&P) 500 Select Sector stock index futures made available by CME Group. Such sector index markets are correlated with one another and, more generally, with the market for S&P 500 futures, such as the E-mini S&P 500 futures made available by CME Group.

In the CME Group example, the stock sector index futures contracts are based upon the various industrial sectors that make up the stock market in general, and the S&P 500 index in particular. These sectors include consumer discretionary, consumer staples, energy, financial, health care, industrial, materials, technology, and utility stocks. These futures contracts may have a notional value of $100× the level of the index. For example, on May 31, 2011, the consumer discretionary index was quoted at 406.16. Thus, the associated futures contract may nominally or notionally be valued at $40,616 (=$100×406.16). Other values are provided in the table of FIG. 5 entitled "Sector Stock Index Futures," which also includes a column directed to indicating the nature of the correlation of each sector index with the broader S&P 500 market. In this embodiment, the relationship between a particular sector index and the broader S&P 500 index is provided by the parameter "beta" ($\beta$). The beta for the consumer discretionary index was calculated as 1.071 as shown in the table.

The parameter beta is indicative of the volatility or risk of an asset or portfolio in accordance with the Capital Asset Pricing Model (CAPM). Other risk metrics may be used, such as the unadjusted notional exposure. The CAPM represents a way of understanding how equity values fluctuate or react to various economic forces driving the market. The model suggests that the total risk associated with any particular stock may be categorized into systematic risks and unsystematic risks. Systematic risk is a reference to "market risks" reflected in general economic conditions and which affect all stocks to some degree. E.g., all stocks are affected to a degree by Federal Reserve monetary policies, by general economic strength or weakness, by tax policies, etc. Unsystematic risk or "firm-specific risks" represent factors that uniquely impact upon a specific stock. E.g., a company may have created a unique new product or its management may have introduced new policies or direction that affect the company to the exclusion of others. The extent to which systematic and unsystematic risks impact upon the price behavior of a corporation may be studied through statistical regression analysis. Accordingly, one may regress the returns of the subject stock ($R_{stock}$) against the price movements of the market in general ($R_{market}$), as follows:

$$R_{stock} = \alpha + \beta(R_{Market}) + \varepsilon$$

$R_{market}$ is generally defined as the returns associated with a macro stock index such as the Standard and Poor's 500 (S&P 500). The alpha ($\alpha$) or intercept of the regression analysis represents the average return on the stock unrelated to market returns. Finally, we have an error term ($\varepsilon$). The regression analysis includes the slope term or beta ($\beta$); and, R-squared ($R^2$), where beta ($\beta$) identifies the expected relative movement between an individual stock and the market. This figure is normally positive to the extent that all stocks tend to rise and fall together. $\beta$ gravitates towards 1.0 or the $\beta$ associated with the market in the aggregate but might be either greater than, or less than, 1.0. For example, if $\beta=1.1$, the stock may be expected to rally by 11% when the market rallies by 10%; or, to decline by 11% if the market declines by 10%. Stocks whose betas exceed 1.0 are more sensitive than the market and are considered "aggressive" stocks. As another example, if $\beta=0.9$, the stock is expected to rally by 9% in response to a 10% market rally; or, to decline by 9% if the market declines by 10%. Stocks whose betas are less than 1.0 are "conservative" stocks because they are less sensitive than the market in general. The term $R^2$ identifies the reliability with which stock returns are explained by market returns. $R^2$ will vary between 0 and 1.0. For example, if $R^2=1.0$, then 100% of stock returns are explained by reference to market returns. This implies perfect correlation such that one might execute a perfect hedge using a derivative instrument that tracks the market. In another example, if $R^2=0$, this suggests a complete lack of correlation and an inability to hedge using a derivative that tracks the market.

Just as one may calculate the beta of any individual stock vs. the S&P 500, one may likewise extend this analysis to other indexes. Thus, one may calculate the beta for the consumer discretionary select sector index as equal to 1.071. This implies that consumer discretionary stocks are generally aggressive stocks, likely to outperform the broader market represented by the S&P 500 in bull markets but likely to underperform in bear markets. Or, one may calculate the beta for the consumer staples select sector index as equal to 0.556. This implies that consumer stables are generally conservative stocks, likely to underperform in bull markets but outperform in bear markets. These results are intuitive to the extent that the term "consumer staples" is a reference to goods that consumers require in good times and in bad. On the other hand, discretionary consumer purchases may be postponed in bad times and hastened in good times.

Traders often wish to enter a series of transactions that are essentially beta neutral, i.e., which carry a weighted average beta of zero. As such, a trader may buy into sectors of the economy that are expected to outperform the market, while selling sectors of the economy which are expected to underperform the market in general. If one does so in a beta-neutral fashion, then this represents a form of a "sector rotation" trade, which may be executed via a compound order.

One may essentially enter into such a sector rotation transaction with use of CME Group Select Sector stock index futures, perhaps in combination with S&P 500 futures as well. There may be other traders that wish to enter (or exit) such strategies and may be content to do so at the daily settlement prices for each of the various stock index futures.

The disclosed methods and systems collect or otherwise receive such complex or compound orders and fulfill those orders at the daily settlement price (or other agreed upon price) in a manner intended to maximize the number of filled orders, recognizing that some order imbalances may exist in the pool of entered orders. In order to do so, an integer linear programming technique or other linear solver is used, as described above. A linear solver may be applied to an operant function directed to maximizing the number of total fills.

The operant function is subject to a number of constraints as described above. In this example, the constraints include the maximum desired position in each leg of the compound order. For instance, each trader may specify a maximum number of contracts to be bought or sold for each futures contract. The linear solver may then be configured with the constraint that the filled orders are bounded by the maximum number and zero.

In this example, an order to buy is represented as a positive integer and an order to sell as a negative integer (e.g., a buy of 150 contracts=150, while a sell of 75 contracts=−75). Each of the 10 futures contracts in the example may be represented as 1, 2, 3, . . . , 10 such that an order may be represented as $Order_{Account,Contract}$. Thus, an order entered by Account A to buy 150 contracts in the 1$^{st}$ of the 10 contracts (consumer discretionary futures) may be notated as $Order_{A,1}=150$. An order to sell 75 contracts in the 2$^{nd}$ of the 10 contracts (consumer staples futures) entered by Account C may be notated as $Order_{C,2}=-75$. The upper and lower constraints for Fills relative to entered orders may be expressed in matrix format as follows:

$$\begin{bmatrix} Fill_{A,1} & \cdots & Fill_{D,1} \\ \vdots & \ddots & \vdots \\ Fill_{A,10} & \cdots & Fill_{D,10} \end{bmatrix} \leq \begin{Vmatrix} Order_{A,1} & \cdots & Order_{D,1} \\ \vdots & \ddots & \vdots \\ Order_{A,10} & \cdots & Order_{D,10} \end{Vmatrix}$$

$$\begin{bmatrix} Fill_{A,1} & \cdots & Fill_{D,1} \\ \vdots & \ddots & \vdots \\ Fill_{A,10} & \cdots & Fill_{D,10} \end{bmatrix} \geq 0$$

Another constraint on the operant function is representative of the order matching Buys and sells in each respective futures contract match or balance such that the net positions created across all accounts total to zero as follows:

$$\Sigma_{Account=A}^{D} Fill_{Account,Contract} = 0$$

Yet another constraint on the operant function involves the maximum net risk exposure levels. In this example, the constraint is directed to ensuring that the fills assigned to each account are such that the net beta-weighted notional or nominal exposure, measured in dollars, is equal (or nearly equal) to zero. This constraint configures the linear solver such that each customer account may hold a net long or short risk exposure as measured or weighted by the beta of each futures contract. Specifying the maximum net risk exposure level allows each market participant to establish a certain degree of risk tolerance for the compound order fulfillment. In this example, the risk tolerance level or net risk exposure level is $10,000 above and below zero for each account. The constraints may be expressed as follows:

$$Exposure_{Account} \geq Lower\ Bound$$

$$Exposure_{Account} \leq Upper\ Bound$$

The upper and lower exposure levels of each account may be weighted by the beta of each futures contract. The beta-weighted risk exposure in each contract for each account may be represented as the product of the underlying Index price in any particular contract ($Index_{contract}$), the futures contract multiplier ($Multiplier_{contract}$), the index beta ($Beta_{contract}$) and the number of long or short fills ($Fill_{Account,Contract}$).

In the example of FIG. 5, the consumer discretionary index is quoted at 406.16, the associated futures contract has a contract multiplier of $100, and a beta of 1.071. If Account A is assigned a fill of 150 long positions in Contract 1 ($Fill_{A,1}$=150), then the beta weighed nominal exposure may be calculated as $6,524,960 (=406.16×$100×1.071×150 contracts). The total exposure assumed by Account A represents the summation of such beta weighted exposures across all contracts as follows:

$$Beta\ Weighted\ Notional\ Exposure = \Sigma_{Contract=1}^{10} Index_{Contract} \times Multiplier_{Contract} \times Beta_{Contract} \times Fill_{Account,Contract}$$

With each trader having a maximum net risk exposure level of, for example, $10,000 for both an upper (long) bound and a lower (short) bound, assume that four market participants A, B, C and D enter maximum orders as shown in the table in FIG. 5 entitled "Entered Orders." In this embodiment, buys are represented by positive integers and sells are represented by negative integers.

Applying the linear solver with an operant function and constraints as described above results in an optimal solution shown in the table of FIG. 5 entitled "Filled Orders." The final table shows the beta-weighted notional exposure levels associated with each transaction, as well as the total, or net, exposure level for each market participant. The solution reached by the linear solver results in net exposure levels within the upper and lower bounds as shown.

Unlike normal spread trades, in which each trade involves two counterparties buying and selling the financial instruments, the disclosed methods and systems enable all of the counterparties in aggregate to satisfy all of the legs. Two counterparties need not be paired up for any particular subset of the trade. The disclosed methods and systems may thus achieve multilateral trade matching.

Note that while our example is cast in the context of stock index futures where the net risk exposure is measured in terms of weighted beta of the portfolio, this system may be applied to other markets apart from stock index futures where risk may be measured through alternate means. While the example of FIG. 5 illustrates the application of the disclosed methods and systems in the context of a series of orders in stock index sector indexes, the disclosed methods and systems are not limited to that context. For example, the methods and systems may be applied to a series of yield curve spreads in the context of Treasury futures or Eurodollar futures. The disclosed methods and systems may also be applied to a series of other related products in the context of currency, energy, metals, agricultural, and other markets. For example, the disclosed methods and systems may be applied to orders in interest rate futures such as 2-year, 3-year, 5-year, 10-year and 30-year Treasury futures, representing different points along the yield curve. The disclosed methods and systems may be applied to a complex series of yield curve spreads across these contracts, in which case the net risk exposure may be measured by, for instance, reference to either the net duration of the resulting portfolio or the net basis point value (BPV) also known as the Dollar Value of an "01" (DV01). In other examples, the disclosed methods and systems may be applied to orders in energy futures, such as crude oil, natural gas, various refined products. In such cases, different futures contracts may be compared in terms of the raw energy value of the product, as in, for example, British Thermal Units (BTUs).

The disclosed methods and systems provide a mechanism for matching a set of compound orders to maximize fulfillment in these and other contexts.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination.

Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for matching compound orders, the method comprising:
   receiving, by a server computer system in communication with a plurality of computer devices via a communication network, compound order data from a group of market participants for a plurality of financial instruments, the compound order data for each market participant of the group of market participants representing a single composite order for multiple financial instruments of the plurality of financial instruments, the compound order data specifying, for at least one of the market participant of the group of market participants, at least one non-listed combination of two or more of the plurality of financial instruments, the compound order data specifying a maximum amount of each financial instrument of the plurality of financial instruments to be bought or sold by each market participant of the group of market participants;
   accessing a memory in which price data is stored, the price data indicating a respective price of each financial instrument of the plurality of financial instruments at which the compound orders are to be executed;
   implementing, with a processor of the server computer system, a linear solver configured for fulfillment of the compound orders, the fulfillment being via order matching for execution at the respective price of each financial instrument of the plurality of financial instruments; and
   transmitting trade data indicative of the order matching for execution of trades among the market participants at the respective price of each financial instrument of the plurality of financial instruments;
   wherein implementing the linear solver comprises:
      configuring the linear solver via a number of constraints on an integer operant function directed to maximizing the fulfillment for the group of market participants, the number of constraints comprising the maximum amounts specified in the compound order data, a respective maximum net risk exposure level for each market participant, and that a net zero number of positions is created for each financial instrument;
      determining net risk exposure levels for each market participant by offsetting, for each market participant, risk exposure values resulting from buy orders with risk exposure values resulting from sell orders; and
      optimizing the integer operant function using the linear solver;
   wherein each respective maximum net risk exposure level specifies long and short bounds on net risk exposure level that allow each market participant to be allocated an unbalanced portfolio as a result of the fulfillment; and
   wherein the compound orders to buy the financial instruments are indicated in the integer operant function via integer numbers of contracts having an opposite sign of the orders to sell the financial instruments.

2. The computer implemented method of claim 1 wherein the order matching within each financial instrument is a further constraint on the integer operant function.

3. The computer implemented method of claim 1 further comprising receiving, via the communication network, the maximum net risk exposure level for at least one of the market participants.

4. The computer implemented method of claim 1 wherein the maximum net risk exposure level is a maximum net beta-weighted notional exposure level.

5. The computer implemented method of claim 1 wherein:
   the plurality of financial instruments are correlated with a market; and
   the net risk exposure levels are determined based on a risk metric of each financial instrument relative to a market indicator of the market.

6. The computer implemented method of claim 5 wherein the market indicator is a market index.

7. A server computer system for matching compound orders, the server computer system comprising a processor and a memory coupled therewith, the server computer system further comprising:

first logic stored in the memory and executable by the processor to receive, from a plurality of computer devices in communication with the server computer system via a communication network, compound order data from a group of market participants for a plurality of financial instruments, the compound order data for each market participant of the group of market participants representing a single composite order for multiple financial instruments of the plurality of financial instruments, the compound order data specifying, for at least one of the market participant of the group of market participants, at least one non-listed combination of two or more of the plurality of financial instruments, the compound order data specifying a maximum amount of each financial instrument of the plurality of financial instruments to be bought or sold by each market participant of the group of market participants;

second logic stored in the memory and executable by the processor to cause the processor to access a database in which price data is stored, the price data indicating a respective price of each financial instrument of the plurality of financial instruments at which the compound orders are to be executed;

third logic stored in the memory and executable by the processor to cause the processor to implement a linear solver configured for fulfillment of the compound orders, the fulfillment being via order matching at the respective price of each financial instrument of the plurality of financial instruments; and fourth logic stored in the memory and executable by the processor to cause the processor to transmit trade data indicative of the order matching for execution of trades among the market participants at the respective price of each financial instrument of the plurality of financial instruments;

wherein the third logic is further executable by the processor to cause the processor to:

configure the linear solver via a number of constraints on an integer operant function directed to maximizing the fulfillment for the group of market participants, the number of constraints comprising the maximum amounts specified in the compound order data, a respective maximum net risk exposure level for each market participant, and that a net zero number of positions is created for each financial instrument;

determine net risk exposure levels for each market participant by offsetting, for each market participant, risk exposure values resulting from buy orders with risk exposure values resulting from sell orders; and optimize the integer operant function using the linear solver;

wherein each respective maximum net risk exposure level specifies long and short bounds on net risk exposure level that allow each market participant to be allocated an unbalanced portfolio as a result of the fulfillment; and wherein the compound orders to buy the financial instruments are indicated in the integer operant function via integer numbers of contracts having an opposite sign of the orders to sell the financial instruments.

8. The system of claim 7 wherein the order matching within each financial instrument is a further constraint on the integer operant function.

9. The system of claim 7 wherein the second logic is further executable by the processor to cause the processor to receive, via the communication network, the maximum net risk exposure level for at least one of the market participants.

10. The system of claim 7 wherein the maximum net risk exposure level is a maximum net beta-weighted notional exposure level.

11. The system of claim 7 wherein:
the plurality of financial instruments are correlated with a market;
the net risk exposure levels are determined based on a risk metric of each financial instrument relative to a market indicator of the market; and
the market indicator is a market index.

12. A computer program product for matching compound orders, the computer program product comprising one or more computer-readable storage media having stored thereon computer-executable instructions that, when executed by one or more processors of a server computer system, cause the server computer system to perform a procedure, the procedure comprising:

receiving, from a plurality of computer devices in communication with the server computer system via a communication network, compound order data from a group of market participants for a plurality of financial instruments, the compound order data for each market participant of the group of market participants representing a single composite order for multiple financial instruments of the plurality of financial instruments, the compound order data specifying, for at least one of the market participant of the group of market participants, at least one non-listed combination of two or more of the plurality of financial instruments, the compound order data specifying a maximum amount of each financial instrument of the plurality of financial instruments to be bought or sold by each market participant of the group of market participants;

accessing a memory in which price data is stored, the price data indicating a respective price of each financial instrument of the plurality of financial instruments at which the orders are to be executed;

implementing a linear solver configured for fulfillment of the compound orders, the fulfillment being via order matching at the respective price of each financial instrument of the plurality of financial instruments; and transmitting trade data indicative of the order matching for execution of trades among the market participants at the respective price of each financial instrument of the plurality of financial instruments;

wherein implementing the linear solver comprises:

configuring the linear solver via a number of constraints on an integer operant function directed to maximizing the fulfillment for the group of market participants, the number of constraints comprising the maximum amounts specified in the compound order data, a respective maximum net risk exposure level for each market participant, and that a net zero number of positions is created for each financial instrument;

determining net risk exposure levels for each market participant by offsetting, for each market participant, risk exposure values resulting from buy orders with risk exposure values resulting from sell orders; and optimizing the integer operant function using the linear solver;

wherein each respective maximum net risk exposure level specifies long and short bounds on net risk exposure level that allow each market participant to be allocated an unbalanced portfolio as a result of the fulfillment; and wherein the compound orders to buy the financial instruments are indicated in the integer operant function via integer numbers of contracts having an opposite sign of the orders to sell the financial instruments.

13. The computer program product of claim 12 wherein the order matching within each financial instrument is a further constraint on the integer operant function.

14. The computer implemented method of claim 1, wherein the maximum net risk exposure level is a risk metric-weighted level.

15. The computer implemented method of claim 1, wherein the maximum net risk exposure level is a volatility metric-weighted level.

* * * * *